(12) United States Patent
Chu et al.

(10) Patent No.: US 11,584,009 B2
(45) Date of Patent: Feb. 21, 2023

(54) COLLABORATIVE ROBOT CONTROL SYSTEM AND METHOD

(71) Applicant: WINBOND ELECTRONICS CORP., Taichung (TW)

(72) Inventors: Te-Wei Chu, Taichung (TW); Chen-Meng Cheng, Taichung (TW); Chun-Ming Huang, Taichung (TW); Kuang-Tai Chen, Hsinchu (TW); Yu-Jen Chang, Taichung (TW); Tsung-Hsien Wu, Taichung (TW)

(73) Assignee: WINBOND ELECTRONICS CORP., Taichung (TW)

( * ) Notice: Subject to any disclaimer, the term of this patent is extended or adjusted under 35 U.S.C. 154(b) by 268 days.

(21) Appl. No.: 16/878,891

(22) Filed: May 20, 2020

(65) Prior Publication Data

US 2020/0368910 A1 Nov. 26, 2020

(30) Foreign Application Priority Data

May 21, 2019 (TW) .................................. 108117412

(51) Int. Cl.
*B25J 9/16* (2006.01)
*B25J 13/00* (2006.01)

(52) U.S. Cl.
CPC ........... *B25J 9/1682* (2013.01); *B25J 9/1602* (2013.01); *B25J 9/1666* (2013.01); *B25J 9/1669* (2013.01); *B25J 13/006* (2013.01)

(58) Field of Classification Search
CPC ...... B25J 9/1664; B25J 9/1666; B25J 13/006; B25J 9/1656
USPC ................................................ 700/245–264
See application file for complete search history.

(56) References Cited

U.S. PATENT DOCUMENTS

| 5,976,199 | A | 11/1999 | Wu et al. |
| 7,457,608 | B2 | 11/2008 | Shah |
| 9,026,244 | B1 * | 5/2015 | Mazzocco ................. G06T 7/66 |
| | | | 700/229 |

(Continued)

FOREIGN PATENT DOCUMENTS

| CN | 109108973 A | 1/2019 | |
| FR | 3046245 A1 * | 6/2017 | ......... G01N 33/0006 |

OTHER PUBLICATIONS

English Translation of FR-3046245, published 2017 (Year: 2017).*

*Primary Examiner* — Jonathan L Sample
(74) *Attorney, Agent, or Firm* — Birch, Stewart, Kolasch & Birch, LLP

(57) ABSTRACT

A collaborative-robot control system is provided in the invention. The collaborative-robot control system includes a plurality of test machines, a plurality of collaborative robots, a first control system and a second control system. The plurality of test machines are configured in a plurality of paths. When the second control system assigns a first collaborative robot of the plurality of collaborative robots in a waiting area to a first test machine in a first path of the plurality of paths and the first collaborative robot is being blocked by a second collaborative robot of the plurality of collaborative robots in the first path, the second control system generates a push-forward command and transmits the push-forward command to the first control system. The first control system sends the push-forward command to the second collaborative robot to order the second collaborative robot to leave the first path first.

6 Claims, 6 Drawing Sheets

(56) References Cited

U.S. PATENT DOCUMENTS

| | | | |
|---|---|---|---|
| 10,192,195 B1* | 1/2019 | Brazeau | B25J 9/1661 |
| 11,188,097 B1* | 11/2021 | Zou | B65G 47/905 |
| 2005/0102064 A1* | 5/2005 | Donoso | H01L 21/67259 |
| | | | 700/254 |
| 2009/0182454 A1* | 7/2009 | Donoso | H01L 21/681 |
| | | | 700/254 |
| 2010/0161124 A1* | 6/2010 | Kimura | B25J 9/1666 |
| | | | 901/14 |
| 2014/0365258 A1* | 12/2014 | Vestal | G05D 1/0297 |
| | | | 901/1 |
| 2018/0299882 A1* | 10/2018 | Kichkaylo | G05B 19/418 |
| 2019/0286145 A1* | 9/2019 | LaFary | G05D 1/0255 |
| 2020/0338733 A1* | 10/2020 | Dupuis | B25J 9/1666 |

\* cited by examiner

COLLABORATIVE ROBOT CONTROL SYSTEM AND METHOD

CROSS REFERENCE TO RELATED APPLICATIONS

This Application claims priority of TW Patent Application No. 108117412 filed on May 21, 2019, the entirety of which is incorporated by reference herein.

BACKGROUND OF THE INVENTION

Field of the Invention

The invention generally relates to collaborative robot control technology, and more particularly, to collaborative robot control technology in which a push-forward mechanism is applied to control collaborative robots.

Description of the Related Art

When a batch of wafers have been generated during a manufacturing process, there is an idle cassette in the test machine where the next batch of wafers may be placed for testing.

However, because the width of each path in the testing house can only accommodate one collaborative robot at a time (i.e. each path is a one-way street), and the collaborative robots receiving tasks may be in different locations in the testing house, one collaborative robot corresponding to a test machine which has not completed its current test may arrive at the test machine early, and as a result, another collaborative robot may be blocked and not able to arrive at its corresponding test machine. Therefore, the temperature of the probe card of the test machine corresponding to the blocked collaborative robot maybe affected, and as a result, the test data will be inaccurate.

BRIEF SUMMARY OF THE INVENTION

The invention provides a collaborative-robot control system and method to overcome the problems described above.

An embodiment of the invention provides a collaborative-robot control system. The collaborative-robot control system comprises a plurality of test machines, a plurality of collaborative robots, a first control system and a second control system. The plurality of test machines are configured in a plurality of paths. When the second control system assigns a first collaborative robot of the plurality of collaborative robots in a waiting area to a first test machine in a first path of the plurality of paths and the first collaborative robot is being blocked by a second collaborative robot of the plurality of collaborative robots in the first path, the second control system generates a push-forward command and transmits the push-forward command to the first control system. The first control system sends the push-forward command to the second collaborative robot to order the second collaborative robot to leave the first path first.

In some embodiment, before the first collaborative robot enters the first path, the second control system determines whether there are any other collaborative robots in the first path, and when there is another collaborative robot in the first path, the second control system determines whether the first collaborative robot is being blocked.

In some embodiments, when the second control system determines that the first collaborative robot is being blocked by the second collaborative robot, the second control system determines whether a second test machine corresponding to the second collaborative robot has completed its test, wherein when the second test machine corresponding to the second collaborative robot has completed its test, the second control system orders the first collaborative robot to stay in the waiting area first.

In some embodiments, when the second test machine corresponding to the second collaborative robot has not completed its test, the second control system further determines whether the first collaborative robot is blocking other collaborative robots which enter the first path later when the first collaborative robot moves to the first test machine. When the second control system determines that the first collaborative robot is not blocking other collaborative robots which enter the first path later, the second control system orders the first collaborative robot to enter the first path.

In some embodiments, when the first collaborative robot enters the first path, the first collaborative robot determines whether there is an obstacle ahead and transmits a determination result to the first control system. When the first collaborative robot determines that there is an obstacle ahead, the first control system determines whether the obstacle is the second collaborative robot. When the obstacle is the second collaborative robot, the first control system sends a trigger event to the second control system, wherein after the second control system receives the trigger event, the second control system determines whether the second test machine corresponding to the second collaborative robot has completed its test. When the second test machine corresponding to the second collaborative robot has completed its test, the second control system orders the first collaborative robot not to move to the first test machine until the second collaborative robot has completed its assigned mission. When the second test machine corresponding to the second collaborative robot has not completed the current test, the second control system generates the push-forward command.

In some embodiments, when the second control system determines that the first collaborative robot is blocking other collaborative robots which enter the first path later, the second control system orders the first collaborative robot to stay in the waiting area first and generates the push-forward command. After the second collaborative robot returns to the waiting area according to the push-forward command, the second control system sorts all collaborative robots which need to enter the first path in the waiting area to generate a sorting result. According to the sorting result, the second control system assigns all of the collaborative robots which need to enter the first path in the waiting area to enter the first path sequentially.

An embodiment of the invention provides a collaborative-robot control method. The collaborative-robot control method comprises the steps of when a first collaborative robot of a plurality of collaborative robots in a waiting area is assigned to a first test machine in a first path of a plurality of paths and the first collaborative robot is being blocked by a second collaborative robot in the first path, generating, via a second control system, a push-forward command; transmitting, via a second control system, the push-forward command to a first control system; and sending, via the first control system, the push-forward command to the second collaborative robot to order the second collaborative robot to leave the first path first.

Other aspects and features of the invention will become apparent to those with ordinary skill in the art upon review of the following descriptions of specific embodiments of the collaborative-robot control system and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
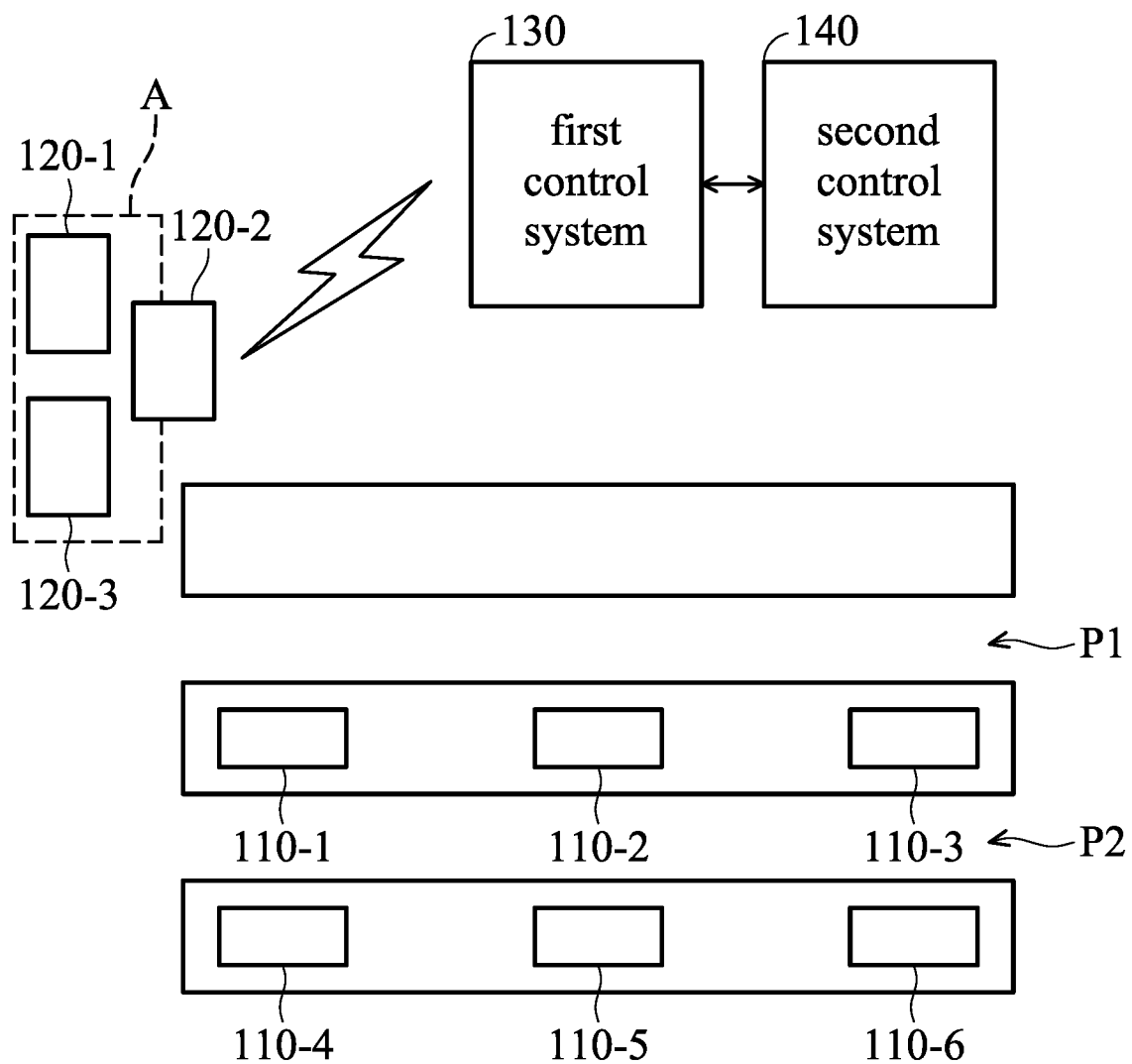
FIG. 1 is a schematic diagram of a collaborative-robot control system 100 according to an embodiment of the invention.

FIG. 1 is a schematic diagram of a collaborative-robot control system 100 according to an embodiment of the invention. As shown in FIG. 1, the collaborative-robot control system 100 may comprise a test machine 110-1, a test machine 110-2, a test machine 110-3, a test machine 110-4, a test machine 110-5, a test machine 110-6, a collaborative robot 120-1, a collaborative robot 120-2, a collaborative robot 120-3, a first control system and a second control system.

As shown in FIG. 1, the test machine 110-1, the test machine 110-2, and the test machine 110-3 are allocated in the first path P1 and the test machine 110-4, the test machine 110-5, and the test machine 110-6 are allocated in the second path P2. In addition, as shown in FIG. 1, in the embodiments of the invention, the widths of the first path P1 and the second path P2 only can accommodate one collaborative robot (i.e. the first path P1 and the second path P2 are one-way streets). According to an embodiment of the invention, the collaborative robot 120-1, the collaborative robot 120-2, and the collaborative robot 120-3 are automatic guided vehicles (AGVs).

According to an embodiment of the invention, the first control system 130 may be an i-operation management (iM). The first control system may be configured to send the commands generated by the second control system 140 to the collaborative robot 120-1, the collaborative robot 120-2, and the collaborative robot 120-3 to control the collaborative robot 120-1, the collaborative robot 120-2, and the collaborative robot 120-3. In addition, the first control system may be configured to receive the messages from the collaborative robot 120-1, the collaborative robot 120-2, and the collaborative robot 120-3 and transmit the messages of the collaborative robot 120-1, the collaborative robot 120-2, and the collaborative robot 120-3 to the second control system 140. According to an embodiment of the invention, the first control system 130 may communicate with the collaborative robots through a wireless communication method, and the first control system 130 may communicate with the second control system 140 through a wire communication method.

According to an embodiment of the invention, the second control system 140 may be configured to send the command to the first control system 130, and receive the messages from the first control system 130. According to an embodiment of the invention, the second control system 140 may comprise a Material Control System (MCS) and a Manufacturing Execution System (MES). The MCS may transmit the messages from the first control system 130 to the MES. The MES may generate the commands which are provided to the collaborative robot 120-1, the collaborative robot 120-2, and the collaborative robot 120-3 according to the messages from the first control system 130, and then transmit the commands to the MCS. Then, the MCS may transmit the commands to the first control system 130 to control the collaborative robot 120-1, the collaborative robot 120-2, and the collaborative robot 120-3.

According to an embodiment of the invention, when the collaborative robot the collaborative robot 120-1, the collaborative robot 120-2, or the collaborative robot 120-3) has not been assigned by the second control system 140 yet, the collaborative robot may stay in a waiting area A to wait for the assignation from the second control system 140.

According to an embodiment of the invention, a check point may be configured in the waiting area A and configured in the start point and the end point of each path (e.g. first path P1 and the second path P2). When the collaborative robot pass through the check point of the waiting area A, the second control system 140 may know that the collaborative robot enters the waiting area A or leaves the waiting area A. Therefore, by configuring the check point in the waiting area A, the second control system 140 may know the number of the collaborative robots in the waiting area A and the order of the collaborative robots in the waiting area A. In addition, when the collaborative robot pass through the check point of the start point of the path or pass through the check point of the end point of the path, the second control system 140 may know that the collaborative robot enters or leaves the path. Therefore, by configuring the check points in the start point and the endpoint of each path, the second control system 140 may know the number of the collaborative robots in each path and the order of the collaborative robots in each path.

According to an embodiment of the invention, before the second control system 140 assigns the collaborative robot 120-2 in the waiting area A to move to the test machine 110-2 at the first path P1 and perform the assigned mission, the second control system 140 may determine whether there are any other collaborative robots at the first path P1 (i.e. the second control system 140 may determine the current number of the collaborative robots at the first path P1). If there is not any other collaborative robot at the first path P1, the second control system 140 may send an assignation command to the first control system 130. Then, the first control system 130 may send the assignation command to the collaborative robot 120-2 to order the collaborative robot 120-2 entering the first path P1 to perform the assigned mission directly.

If there is another collaborative robot at the first path P1, the second control system 140 may determine whether the collaborative robot may block the collaborative robot 120-2. If the collaborative robot may not block the collaborative robot 120-2, the second control system 140 may send an assignation command to the first control system 130. Then, the first control system 130 may send the assignation command to the collaborative robot 120-2 to order the collaborative robot 120-2 entering the first path P1 to perform the assigned mission directly.

If the collaborative robot may block the collaborative robot 120-2, the second control system 140 may determine whether the test machine corresponding to the collaborative robot which is blocking the collaborative robot 120-2 has completed the current test. If the test machine corresponding to the collaborative robot which is blocking the collaborative robot 120-2 has completed the current test (i.e. the collaborative robot can pick up the tested objected on the test machine and replace the tested objected by the new tested objected), the second control system 140 may order the collaborative robot 120-2 to stay in the waiting area A to wait until it receives the assignation command first through the first control system 130. After the collaborative robot has picked up the tested objected on the test machine and replaced the tested objected by the new tested objected, the second control system 140 may send the assignation command to the collaborative robot 120-2 to order the collaborative robot 120-2 entering the first path P1 to perform the assigned mission directly.

If the test machine corresponding to the collaborative robot which is blocking the collaborative robot 120-2 has not completed the current test (i.e. the collaborative robot cannot pick up the tested objected on the test machine and replace the tested objected by the new tested objected), the second control system 140 may determine whether the collaborative robot 120-2 may block other collaborative robots entering the first path later (i.e. the second control system 140 may determine whether the infinite loop will occur), after the collaborative robot 120-2 enters the first path P1 and moves to the test machine 110-2.

Figure 2A:
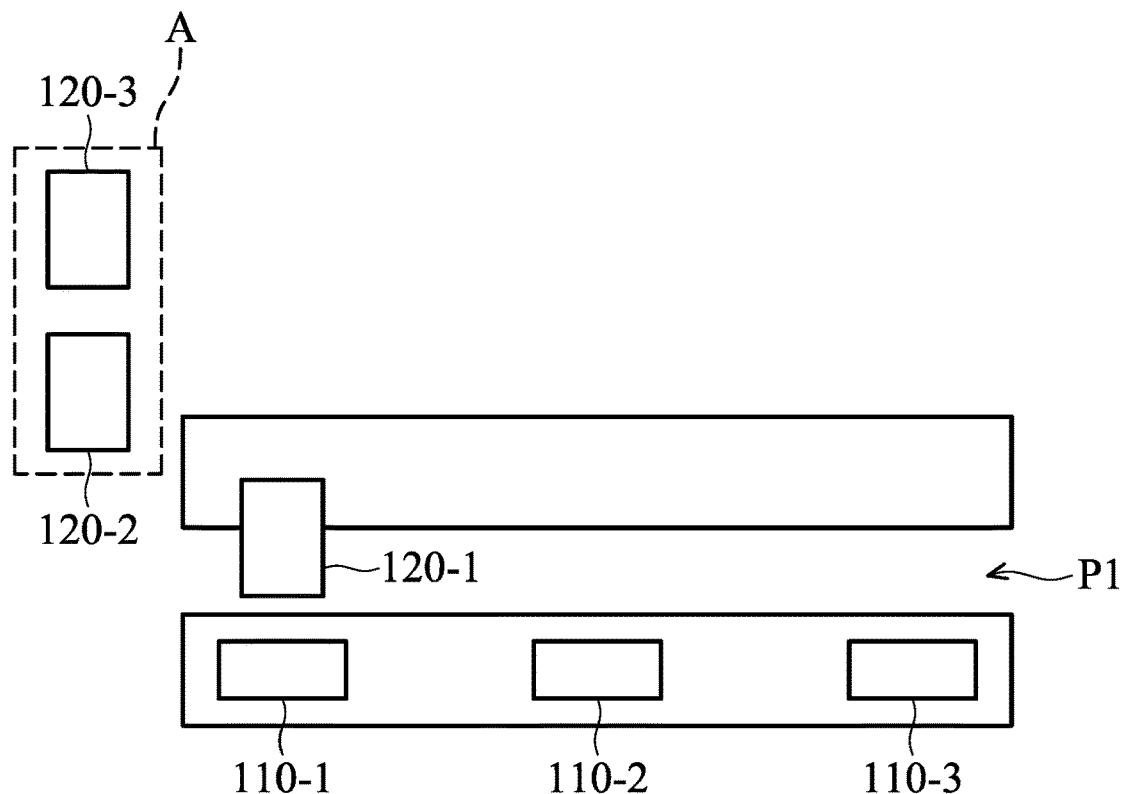
FIG. 2A is a schematic diagram of push-forward mechanism according to an embodiment of the invention.

According to an embodiment of the invention, if the collaborative robot 120-2 is not blocking other collaborative robots entering the first path later, it means that the infinite loop will not occur. FIG. 2A is taken as an example for illustration below. As shown in FIG. 2A, the collaborative robot 120-2 is only blocked by the collaborative robot 120-1. Therefore, after the second control system 140 sends the push-forward command to order the collaborative robot 120-1 to leave the first path P1 first and to order the collaborative robot 120-2 to enter the first path P1 to perform the assigned mission, the collaborative robot 120-2 is not blocking the collaborative robot 120-1 when the collaborative robot 120-1 returns to the first path P1 Specifically, in the embodiment of the invention, the second control system 140 may send the assignation command to the collaborative robot 120-1 to order the collaborative robot 120-2 to enter the first path P1 to perform the assigned mission. After the collaborative robot 120-2 enters the first path P1 (i.e. the collaborative robot 120-2 passes through the check point of the start point of the first path P1), the collaborative robot 120-2 may determine whether there is an obstacle ahead, and transmit the determination result to the first control system 130. When the collaborative robot 120-2 determines that there is not an obstacle ahead, the collaborative robot 120-2 may keep going on the first path P1. When the collaborative robot 120-2 determines that there is an obstacle ahead, the first control system 130 may determine whether the obstacle is the collaborative robot 120-1 which is blocking the collaborative robot 120-2. If the obstacle is not the collaborative robot 120-1, the first control system 130 may give the alarm to order the field personnel to remove the obstacle (e.g. people or other objects). If the obstacle is the collaborative robot 120-1, the first control system 130 may send a trigger event to the second control system 140. After the second control system 140 receives the trigger event, the second control system 140 may determine whether the test machine corresponding to the collaborative robot 120-1 which is blocking the collaborative robot 120-2 has completed the current test. If the test machine 110-1 corresponding to the collaborative robot 120-1 which is blocking the collaborative robot 120-2 has completed the current test (i.e. the collaborative robot 120-1 can pick up the tested objected on the test machine 110-1 and replace the tested objected by the new tested objected), the second control system 140 may order the collaborative robot 120-2 to remain on the first path P1 first. The collaborative robot 120-2 will not move to the test machine 110-2 to perform the assigned mission until the collaborative robot 120-1 has completed its mission (i.e. the collaborative robot 120-1 has picked up the tested objected on the test machine 110-1 and replaced the tested objected by the new tested objected). If the test machine 110-1 corresponding to the collaborative robot 120-1 which is blocking the collaborative robot 120-2 has not completed the current test (i.e. the collaborative robot 120-1 has not been able to pick up the tested objected on the test machine 110-1 and replace the tested objected by the new tested objected), the second control system 140 may send the push-forward command to the first control system 130, and then the first control system 130 sends the push-forward command to the collaborative robot 120-1 which is blocking the collaborative robot 120-2. After the collaborative robot 120-1 which is blocking the collaborative robot 120-2 receives the push-forward command, the collaborative robot 120-1 may leave the first path P1 first and then go to the waiting area A to await the order, or the collaborative robot 120-1 may go around the first path P1 and then return to the test machine 110-1. After the collaborative robot 120-1 which is blocking the collaborative robot 120-2 leaves the first path P1, the collaborative robot 120-2 will move to the test machine 110-2 to perform the assigned mission.

Figure 2B:
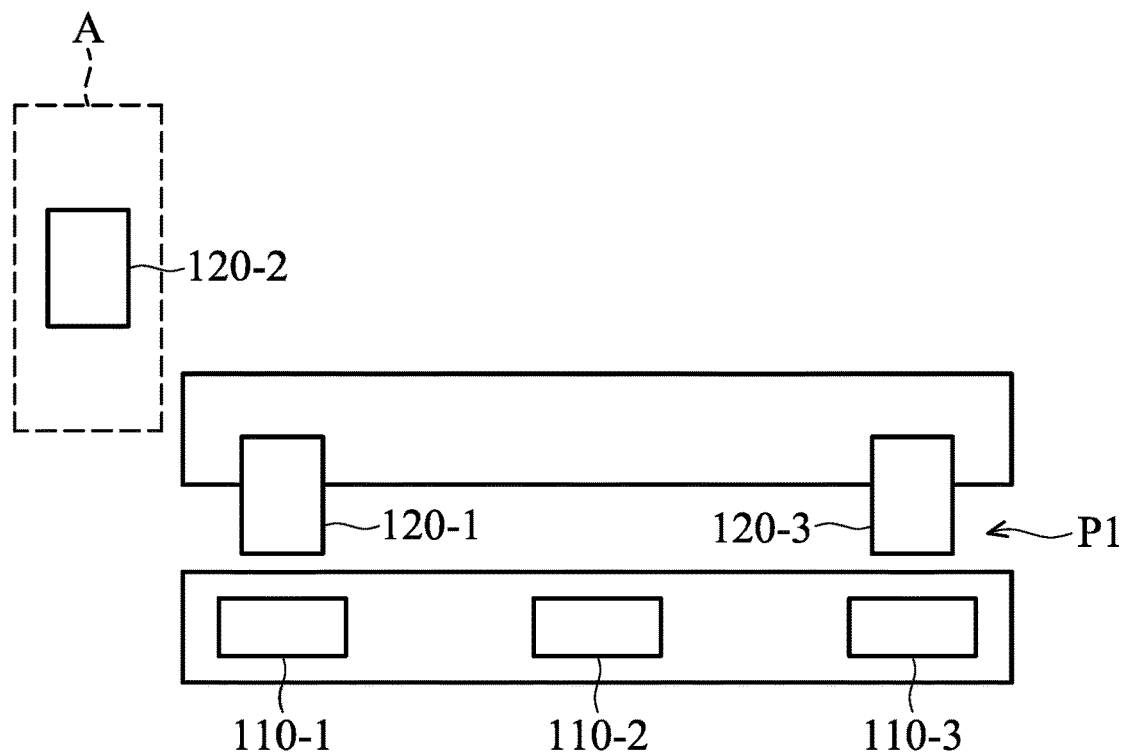
FIG. 2B is a schematic diagram of push-forward mechanism according to another embodiment of the invention.

According to an embodiment of the invention, if the collaborative robot 120-2 may block other collaborative robots entering the first path later, it means that the infinite loop will occur. FIG. 2B is taken as an example for illustration below. As shown in FIG. 2B, there are collaborative robot 120-1 and collaborative robot 120-3 in the first path P1, and when the collaborative robot 120-2 moves into the first path P1, the collaborative robot 120-2 will be blocked by the collaborative robot 120-1. Because when the second control system sends the push-forward command to order the collaborative robot 120-1 to leave the first path P1 first, the collaborative robot 120-3 will be pushed out of the first path P1. Therefore, when the collaborative robot 120-2 moves into the first path P1 to perform the assigned mission, the collaborative robot 120-2 may block the path the collaborative robot 120-3 returning to the test machine 110-3 (i.e. the infinite loop will occur). Specifically, in the embodiment, the second control system 140 may order the collaborative robot 120-2 to wait in the waiting area A first. Then, the second control system 140 may send the push-forward command to the first control system 130, and then the first control system 130 sends the push-forward command to the collaborative robot 120-1 which is blocking the collaborative robot 120-2. After the collaborative robot 120-1 receives the push-forward command, the collaborative robot 120-1 may leave the first path P1 first and then go to the waiting area A. In addition, as the above push-forward mechanism, when the collaborative robot 120-1 leaves the first path P1, the collaborative robot 120-1 will be blocked by the collaborative robot 120-3. Therefore, the second control system 140 may also sends the push-forward command to order the collaborative robot 120-3 to leave the first path P1 first and then go to the waiting area A. When the collaborative robot 120-1 and collaborative robot 120-3 arrive in the waiting area A, the second control system 140 may sort all collaborative robots which need to enter the first path P1 (i.e. the collaborative robot 120-1, collaborative robot 120-2 and collaborative robot 120-3) in h waiting area A to generate a sorting result. According to the sorting result, the second control system 140 may sequentially assign the collaborative robot 120-1, collaborative robot 120-2 and collaborative robot 120-3 to enter the first path P1 to perform the assigned missions.

It should be noted that unlike FIG. 2A, in the embodiment of FIG. 2, when the second control system 140 send the push-forward command to the collaborative robot 120-1, the collaborative robot 120-2 is in the waiting area A, not in the first path P1. In addition, in the embodiment of the invention, after the collaborative robot 120-1 and the collaborative robot 120-3 receive the push-forward command, the collaborative robot 120-1 and the collaborative robot 120-3 will go to the waiting area A, not directly go around the first path 1 and then return to the first path P1.

Figure 3A:
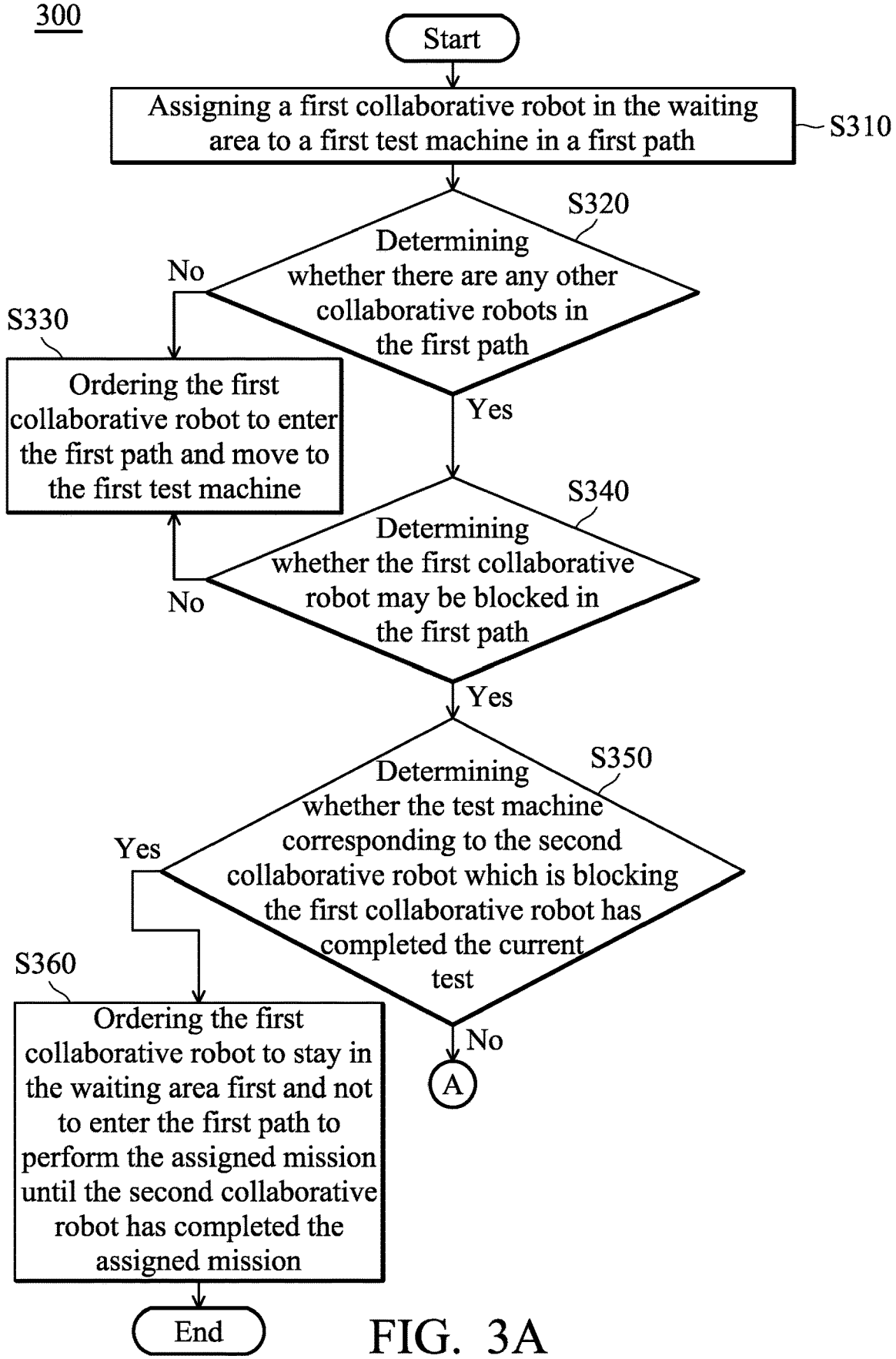
FIG. 3A-3B is a flow chart 300 illustrating a collaborative-robot control method according to an embodiment of the invention.
Figure 3B:
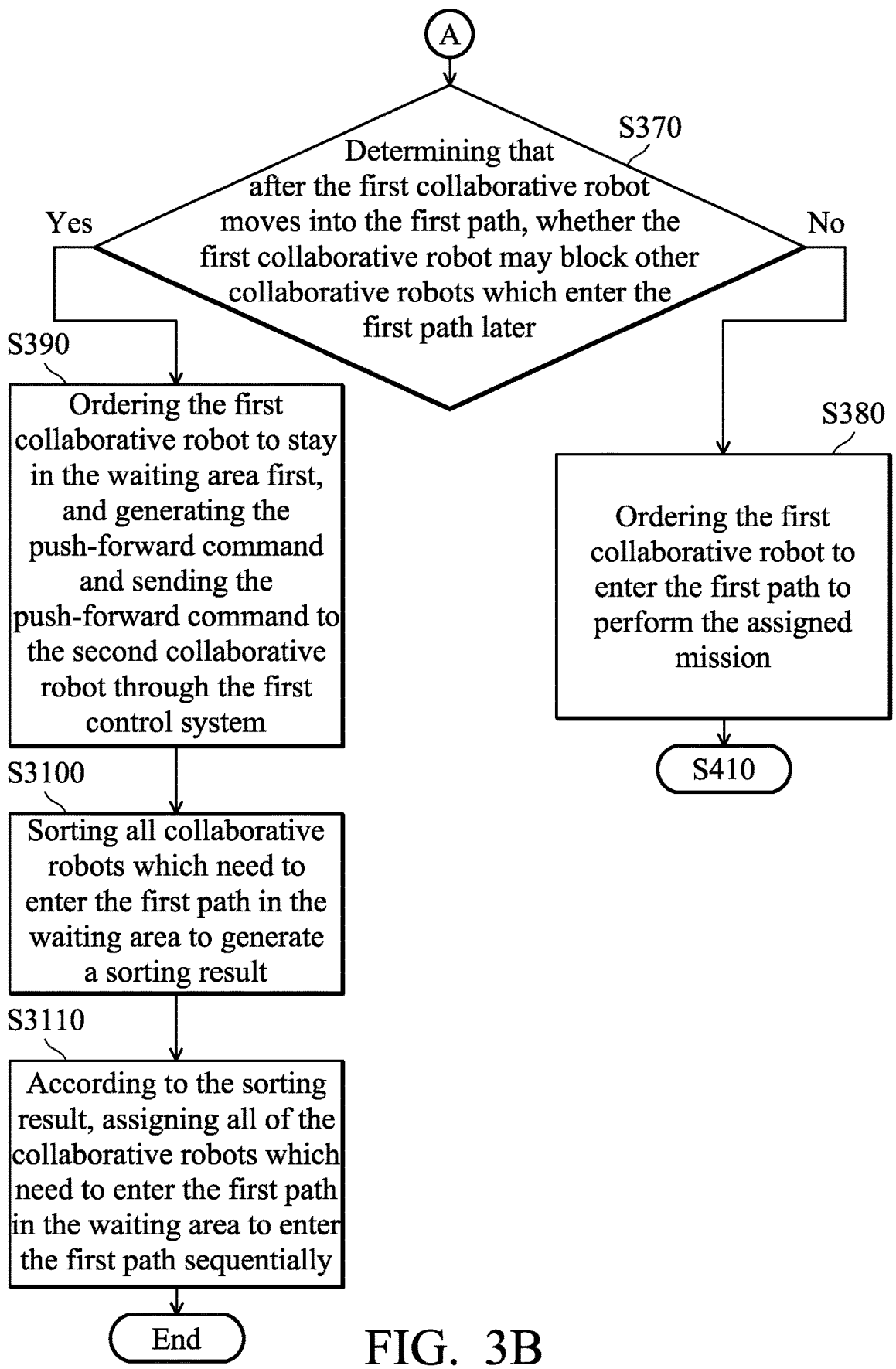

FIG. 3A-3B is a flow chart 300 illustrating a collaborative-robot control method according to an embodiment of the invention. The collaborative-robot control method can be applied to the collaborative-robot control system 100. In step S310, the second control system 140 assigns a first collaborative robot in the waiting area to a first test machine in a first path. In step S320, the second control system 140 determines whether there are any other collaborative robots in the first path. If the second control system 140 determines that there is not any other collaborative robot in the first path, step S330 is performed. In step S330, the second control system 140 orders the first collaborative robot to enter the first path and move to the first test machine.

If the second control system 140 determines that there is another collaborative robot in the first path, step S340 is performed. In step S340, the second control system 140 determines whether the first collaborative robot may be blocked in the first path. If the first collaborative robot may not be blocked in the first path, step S330 is performed. The second control system 140 orders the first collaborative robot to enter the first path and move to the first test machine. If the first collaborative robot may be blocked by a second collaborative robot in the first path, step S350 is performed. In step S350, the second control system 140 determines whether the test machine corresponding to the second collaborative robot which is blocking the first collaborative robot has completed the current test. If the test machine corresponding to the second collaborative robot which is blocking the first collaborative robot has completed the current test, step S360 is performed. In step S360, the second control system 140 orders the first collaborative robot to stay in the waiting area first and not to enter the first path to perform the assigned mission until the second collaborative robot has completed the assigned mission.

If the test machine corresponding to the second collaborative robot which is blocking the first collaborative robot has not completed the current test, step S370 is performed. In step S370, the second control system 140 determines that after the first collaborative robot moves into the first path, whether the first collaborative robot may block other collaborative robots which enter the first path later (i.e. the second control system 140 may determine whether the infinite loop will occur). When the second control system 140 determines that the first collaborative robot may not block other collaborative robots which enter the first path later, step S380 is performed. In step S380, the second control system 140 orders the first collaborative robot to enter the first path to perform the assigned mission.

When the second control system 140 determines that the first collaborative robot may block other collaborative robots which enter the first path later, step S390 is performed. In step S390, the second control system 140 orders the first collaborative robot to stay in the waiting area first, and then, the second control system 140 generates the push-forward command and sends the push-forward command to the second collaborative robot through the first control system 130. In step S3100, after the second collaborative robot returns to the waiting area according to the push-forward command, the second control system 140 may sort all collaborative robots which need to enter the first path in the waiting area to generate a sorting result. In step 3110, according to the sorting result, the second control system 140 may sequentially assign all of the collaborative robots which need to enter the first path in the waiting area to enter the first path.

Figure 4A:
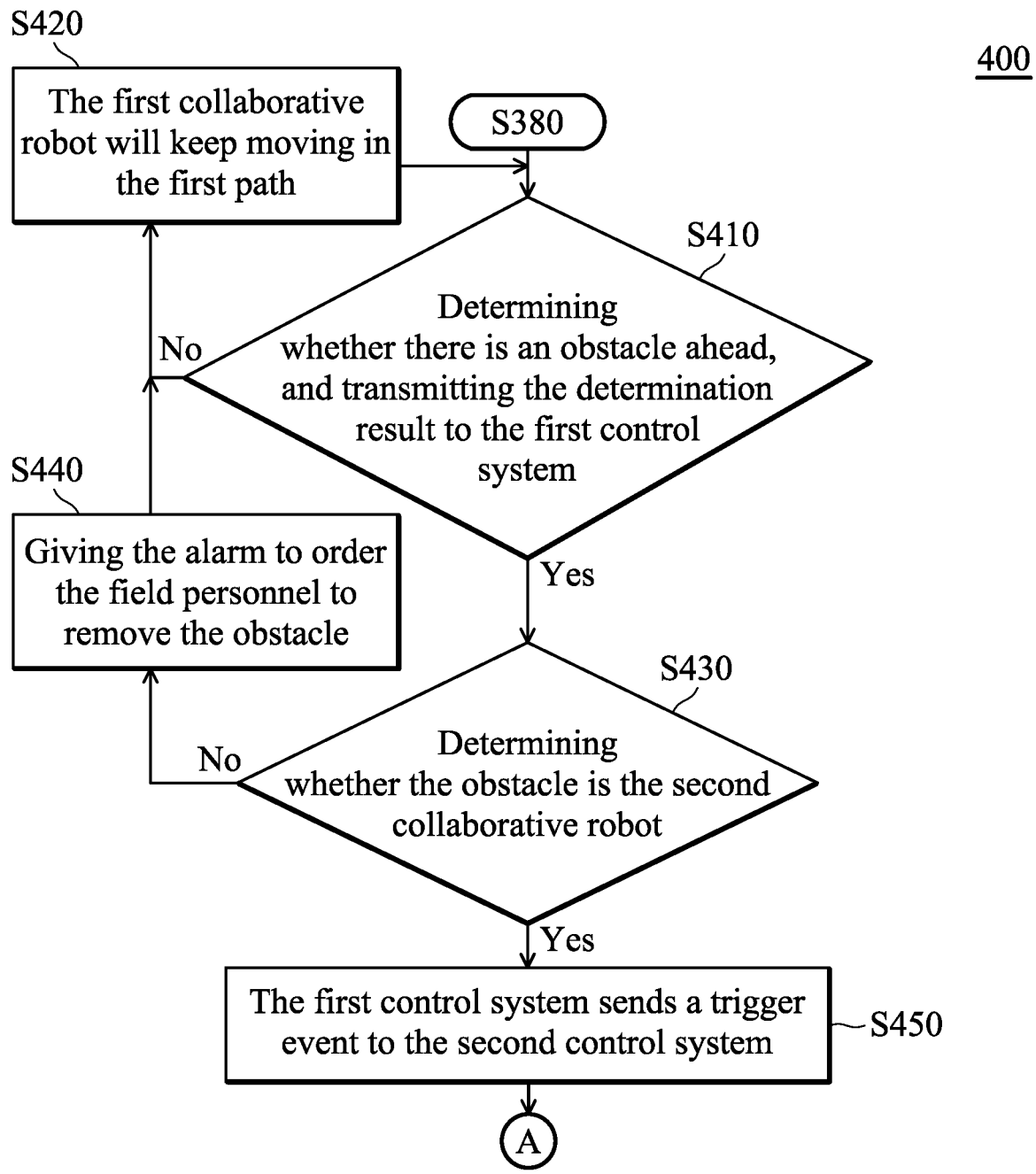
FIG. 4A-4B is a flow chart 400 illustrating a collaborative-robot control method according to another embodiment of the invention.
Figure 4B:
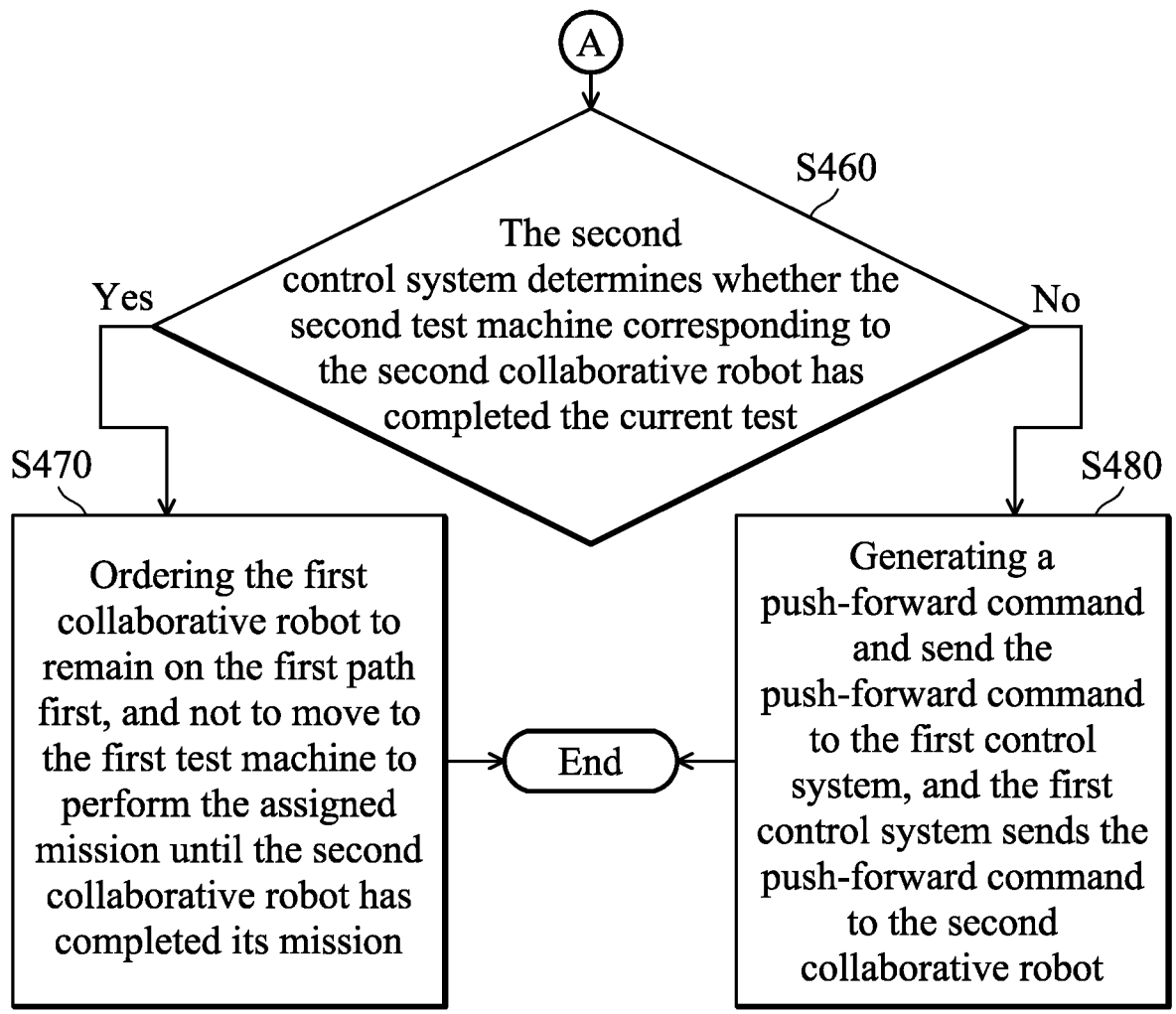

FIG. 4 is a flow chart 400 illustrating a collaborative-robot control method according to another embodiment of the invention. The steps of the flow chart 400 can be performed after step S380. As shown in FIG. 4, in step S410, the first collaborative robot determines whether there is an obstacle ahead, and transmits the determination result to the first control system 130. When the first collaborative robot determines that there is no obstacle ahead, step S420 is performed. In step S420, the first collaborative robot will keep moving in the first path, and the collaborative-robot control method returns to step S410.

When the first collaborative robot determines that there is an obstacle ahead, step S430 is performed. In step S430, the first control system 130 determines whether the obstacle is the second collaborative robot. If the obstacle is not the second collaborative robot, step S440 is performed. In step S440, the first control system 130 may give the alarm to order the field personnel to remove the obstacle.

If the obstacle is the second collaborative robot, step S450 is performed. In step S450, the first control system 130 may send a trigger event to the second control system 140. In step S460, after the second control system 140 receives the trigger event, the second control system 140 may determine whether the second test machine corresponding to the second collaborative robot has completed the current test. When the second test machine corresponding to the second collaborative robot has completed the current test, step 470 is performed. In step S470, the second control system 140 may order the first collaborative robot to remain on the first path first, and not to move to the first test machine to perform the assigned mission until second collaborative robot has completed its mission. When the second test machine corresponding to the second collaborative robot has not completed the current test, step 480 is performed. In step S480, the second control system 140 may generate a push-forward command and send the push-forward command to the first control system 130, and then the first control system 130 sends the push-forward command to the second collaborative robot.

According to the collaborative-robot control method provided in the invention, in the push-forward mechanism of the collaborative robot, when one collaborative robot in a path is blocking the path of another collaborative robot, the control system may determine whether to push forward the collaborative robot from the path first. Therefore, the temperature of the probe card of the test machine will not be affected because the test machine is not holding on too long. Furthermore, the efficiency of the collaborative robot performing the assigned missions will be increased. In addition, no infinite loops will occur because the collaborative robots are not being pushed forward from the path at the same time.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A collaborative-robot control system, comprising:
a plurality of test machines, configured in a plurality of paths, wherein each path is one-way street, each path is configured more than one test machine of the plurality of test machines, and a width of each path is not able to accommodate more than one collaborative robot;
a plurality of collaborative robots;
a first control system; and
a second control system, wherein when the second control system assigns a first collaborative robot of the plurality of collaborative robots in a waiting area to a first test machine in a first path of the plurality of paths to pick up a tested objected which has been tested by the first test machine and replace the tested objected by a new tested objected which needs to be tested by the first test machine and the first collaborative robot is being blocked by a second collaborative robot of the plurality of collaborative robots in the first path, the second control system generates a push-forward command and transmits the push-forward command to the first control system,
wherein the first control system sends the push-forward command to the second collaborative robot to order the second collaborative robot to leave the first path first,
wherein before the first collaborative robot enters the first path, the second control system determines whether there are any other collaborative robots in the first path based on a first check point of a start point of the first path and a second check point of an end point of the first path, and when there is another collaborative robot in the first path, the second control system determines whether the first collaborative robot is being blocked,
wherein when the second control system determines that the first collaborative robot is being blocked by the second collaborative robot, the second control system determines whether a second test machine corresponding to the second collaborative robot has completed its test,
wherein when the second test machine corresponding to the second collaborative robot has completed its test, the second control system orders the first collaborative robot to stay in the waiting area first,
wherein when the second test machine corresponding to the second collaborative robot has not completed its test, the first control system sends the push-forward command to the second collaborative robot, and the second control system further determines whether the first collaborative robot is blocking other collaborative robots which enter the first path later when the first collaborative robot moves to the first test machine,
wherein when the second control system determines that the first collaborative robot is not blocking other collaborative robots which enter the first path later, the second control system orders the first collaborative robot to enter the first path.

2. The collaborative-robot control system of claim 1, wherein when the first collaborative robot enters the first path, the first collaborative robot determines whether there is an obstacle ahead and transmits a determination result to the first control system, wherein when the first collaborative robot determines that there is an obstacle ahead, the first control system determines whether the obstacle is the second collaborative robot, wherein when the obstacle is the second collaborative robot, the first control system sends a trigger event to the second control system, wherein after the second control system receives the trigger event, the second control system determines whether the second test machine corresponding to the second collaborative robot has completed its test, wherein when the second test machine corresponding to the second collaborative robot has completed its test, the second control system orders the first collaborative robot not to move to the first test machine until the second collaborative robot has completed its assigned mission, and when the second test machine corresponding to the second collaborative robot has not completed its test, the second control system generates the push-forward command.

3. The collaborative-robot control system of claim 1, wherein when the second control system determines that the first collaborative robot is blocking other collaborative robots which enter the first path later, the second control system orders the first collaborative robot to stay in the waiting area first and generates the push-forward command, wherein after the second collaborative robot returns to the waiting area according to the push-forward command, the second control system sorts all collaborative robots which need to enter the first path in the waiting area to generate a sorting result, wherein according to the sorting result, the second control system sequentially assigns all of the collaborative robots which need to enter the first path in the waiting area to enter the first path.

4. A collaborative-robot control method, comprising:
when a first collaborative robot of a plurality of collaborative robots in a waiting area is assigned to a first test machine in a first path of a plurality of paths to pick up a tested objected which has been tested by the first test machine and replace the tested objected by a new tested objected which needs to be tested by the first test machine and the first collaborative robot is being blocked by a second collaborative robot of the plurality of collaborative robots in the first path, generating, by a second control system, a push-forward command, wherein each path is one-way street, each path is configured more than one test machine of the plurality of test machines, and a width of each path is not able to accommodate more than one collaborative robot;
transmitting, by a second control system, the push-forward command to a first control system; and
sending, by the first control system, the push-forward command to the second collaborative robot to order the second collaborative robot to leave the first path first,
wherein the collaborative-robot control method further comprises:
before the first collaborative robot enters the first path, the second control system determines whether there are any other collaborative robots in the first path based on a first check point of a start point of the first path and a second check point of an end point of the first path; and
when there is another collaborative robot in the first path, the second control system determines whether the first collaborative robot is being blocked, when the second control system determines that the first collaborative robot is being blocked by the second collaborative robot, determining, by the second control system, whether a second test machine corresponding to the second collaborative robot has completed its test, when the second test machine corresponding to the second collaborative robot has completed its test, ordering, by the second control system, the first collaborative robot to stay in the waiting area first;

when the second test machine corresponding to the second collaborative robot has not completed its test, sending, by the first control system, the push-forward command to the second collaborative robot and determining, by the second control system, whether the first collaborative robot is blocking other collaborative robots which enter the first path later when the first collaborative robot moves to the first test machine; and when the second control system determines that the first collaborative robot is not blocking other collaborative robots which enter the first path later, ordering, by the second control system, the first collaborative robot to enter the first path.

5. The collaborative-robot control method of claim 4, further comprising:

when the first collaborative robot enters the first path, determining, by the first collaborative robot, whether there is an obstacle ahead and transmitting a determination result to the first control system;

when the first collaborative robot determines that there is an obstacle ahead, determining, by the first control system, whether the obstacle is the second collaborative robot;

when the obstacle is the second collaborative robot, sending, by the first control system, a trigger event to the second control system;

after the second control system receives the trigger event, determining, by the second control system, whether the second test machine corresponding to the second collaborative robot has completed its test;

when the second test machine corresponding to the second collaborative robot has completed its test, ordering, by the second control system, the first collaborative robot not to move to the first test machine until the second collaborative robot has completed its assigned mission; and when the second test machine corresponding to the second collaborative robot has not completed its test, generating, by the second control system, the push-forward command.

6. The collaborative-robot control method of claim 4, further comprising:

when the second control system determines that the first collaborative robot is blocking other collaborative robots which enter the first path later, ordering, by the second control system, the first collaborative robot to stay in the waiting area first and generating, by the second control system, the push-forward command;

after the second collaborative robot returns to the waiting area according to the push-forward command, sorting, by the second control system, all collaborative robots which need to enter the first path in the waiting area to generate a sorting result; and according to the sorting result, assigning, by the second control system, all of the collaborative robots which need to enter the first path in the waiting area to enter the first path sequentially.

* * * * *